US011050738B1

(12) United States Patent
Barakat et al.

(10) Patent No.: US 11,050,738 B1
(45) Date of Patent: Jun. 29, 2021

(54) DEFINED ZONE OF AUTHENTICATION (71) Applicant: Wells Fargo Bank, N.A., San Francisco, CA (US)

(72) Inventors: Wayne Barakat, Novato, CA (US); Sotirios K. Barkas, San Jose, CA (US); Michael Chang, Millbrae, CA (US); Laura Marie Fontana, San Francisco, CA (US); Julio Jiron, San Bruno, CA (US); Beth S. Moss, Danville, CA (US); Traci Nguyen, San Francisco, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 26 days.

(21) Appl. No.: 16/597,256

(22) Filed: Oct. 9, 2019

Related U.S. Application Data (63) Continuation of application No. 15/373,823, filed on Dec. 9, 2016, now Pat. No. 10,505,924.

(51) Int. Cl.
*H04L 29/06* (2006.01)
(52) U.S. Cl.
CPC ........ *H04L 63/083* (2013.01); *H04L 63/0815* (2013.01); *H04L 63/0861* (2013.01)
(58) Field of Classification Search
CPC .................. H04L 63/083; H04L 63/0815; H04L 63/0861
See application file for complete search history.

(56) References Cited

U.S. PATENT DOCUMENTS

| 6,774,796 | B2 | 8/2004 | Smith |
| 7,401,235 | B2 | 7/2008 | Mowers et al. |
| 7,539,856 | B2 | 5/2009 | Buch et al. |
| 8,141,140 | B2 | 3/2012 | Wenzel et al. |
| 8,832,798 | B2 | 9/2014 | Thavasi et al. |
| 8,839,358 | B2 | 9/2014 | Strauss et al. |
| 9,117,064 | B2 | 8/2015 | Barrett |
| 9,160,730 | B2 | 10/2015 | Sheller et al. |
| 9,282,090 | B2 * | 3/2016 | Liberman ............... H04L 43/08 |
| 9,742,764 | B1 | 8/2017 | Ziraknejad et al. |

(Continued)

FOREIGN PATENT DOCUMENTS

WO 2010108335 A1 9/2010

OTHER PUBLICATIONS

Shi, Elaine et al., "Implicit Authentication through Learning User Behavior," Palo Alto Research Center, University of California, Davis, http://elaineshi.com/docs/isc.pdf, Dec. 31, 2011, 16 pages.

(Continued)

*Primary Examiner* — Joseph P Hirl
*Assistant Examiner* — Ka Shan Choy
(74) *Attorney, Agent, or Firm* — Merchant & Gould P.C.

(57) ABSTRACT

Embodiments of the disclosure are directed to authenticating a user at an electronic computing device. Information is received from a defined zone of an environment surrounding the user. A level of authentication is calculated for the user based on the information from the defined zone of the environment. When the level of authentication is greater than or equal to a predetermined threshold, the user is authenticated at the electronic computing device to perform a requested activity.

20 Claims, 5 Drawing Sheets

(56) References Cited

U.S. PATENT DOCUMENTS

| | | |
|---|---|---|
| 2007/0245157 A1* | 10/2007 | Giobbi .................. G06F 21/32 |
| | | 713/186 |
| 2014/0316984 A1 | 10/2014 | Schwartz |
| 2014/0337243 A1 | 11/2014 | Dutt et al. |
| 2014/0337945 A1 | 11/2014 | Jia et al. |
| 2015/0135310 A1 | 5/2015 | Lee |
| 2015/0242605 A1 | 8/2015 | Du et al. |
| 2015/0319730 A1 | 11/2015 | Seine |
| 2015/0358333 A1 | 12/2015 | Cronin |
| 2016/0021535 A1* | 1/2016 | Tali ...................... H04W 4/021 |
| | | 455/411 |
| 2016/0156609 A1 | 6/2016 | Grigg et al. |
| 2017/0013464 A1* | 1/2017 | Fish ...................... H04W 12/08 |
| 2018/0041518 A1* | 2/2018 | Jacobs .................. H04L 63/08 |
| 2018/0103341 A1 | 4/2018 | Moiyallah, Jr. et al. |

OTHER PUBLICATIONS

Milton, Leslie et al., "N-Gram-Based User Behavioral Model for Continuous User Authentication," Department of Computer Science, University of Maryland, College Park, http://www.cs.umd.edu/~atif/pubs/securware2014.pdf, Jan. 1, 2014, 7 pages.

* cited by examiner

DEFINED ZONE OF AUTHENTICATION

BACKGROUND

Individuals typically need to be authenticated at an electronic computing device to perform transactions and access data on the electronic computing device. An authentication process can verify an identity of the user and permit the user to access the electronic computing device when authenticated.

A common method of authentication is for the user to enter a user ID and a password. However, the user ID and password may need to be reentered each time the user logs into the electronic computing device. In addition, user IDs and passwords can be lost, stolen or forgotten.

SUMMARY

Embodiments of the disclosure are directed to a method implemented on an electronic computing device for authenticating a user at the electronic computing device, the method comprising: receiving information from a defined zone of an environment surrounding the user; calculating a level of authentication for the user based on the information from the defined zone of the environment; and when the level of authentication is greater than or equal to a predetermined threshold, authenticating the user at the electronic computing device to perform a requested activity.

In another aspect, a method implemented on an electronic computing device for authenticating a user at the electronic computing device comprises obtaining a geolocation of user; obtaining first information regarding a current context for the user; obtaining second information regarding one or more individuals in close proximity with the user; based on the geolocation, the first information and the second information, determining a level of authentication for the user that can be used to authenticate the user at the electronic computing device; and when the level of authentication is greater than a predetermined threshold, authenticating the user at the electronic computing device.

In yet another aspect, an electronic computing device comprises: a processing unit; and system memory, the system memory including instructions which, when executed by the processing unit, cause the electronic computing device to: obtain a geolocation of a user; obtain first information regarding a current context for the user; obtain second information regarding one or more biometric parameters regarding the user; obtain third information regarding one or more individuals in close proximity with the user, the third information including whether the one or more individuals are known to the user and whether one or more of the individuals are known to be a security risk; based on the geolocation, the first information, the second information and the third information, determine a level of authentication for the user that can be used to authenticate the user at the electronic computing device; receive updates for one or more of the geolocation, the first information, the second information and the third information; recalculate the level of authentication based on the updates; and maintain an authentication for the user at the electronic computing device as long as the level of authentication remains greater than or equal to the predetermined threshold.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for implementing a method of persistent authentication at an electronic computing device. Using the systems and methods, a context is determined for a user and, as long as the context is maintained and other conditions are met, the user can remain authenticated at the electronic computing device. The context can be based on a current geolocation of the user, a current activity of the user and activity habits of the user. The other conditions can include an identity of individuals at or near the geolocation of the user, biometric data from the user and other factors. In addition, the user may be interacting with the electronic computing device via multiple devices within a time period for which the context is maintained.

When authenticated in this manner, a figurative zone of authentication can be considered to surround the user. In the examples described herein, the zone is a persistent area surrounding the user. For example, the embodiments disclosed herein describe the zone as a "sphere" although other shapes and sizes of zones can be used, such as a zone that is more flat in configuration (e.g., an elongated cube).

The example sphere described herein can define a persistent level of authentication, whereby the user can be authenticated and remain authenticated. When attributes of the context and the other conditions fall within the sphere, the user can remain authenticated. However, when the attributes of the context or the other conditions fall outside the sphere, the level of authentication drops and user may not be permitted to be authenticated or may no longer be authenticated.

In these examples, the sphere defines the area of the environment surrounding the user that will be examined for authentication purposes. The area of the environment within the sphere can be examined to gather information about the user that might be helpful for authentication purposes.

The sphere can be of a size that is dependent on a user's environment. When the user's environment is such that more sources of information can be used to authenticate the user, the sphere can be of a larger size than when there are fewer sources of information. For example, when the user is in a location like the center of a large city with lots of available information about the user, such as location, WiFi access points, and others surrounding the individual, the size of the sphere can be large. As another example, when the user is in a remote area, such as a forest, the sphere can also be larger to attempt to obtain more information about the user.

In contrast, when the user is in a public area, such as a sports arena, the sphere may shrink in size to focus on the user rather than information surrounding the user that will not be helpful for authentication purposes, such as individuals not related to or otherwise associated with the user. For example, in the sports arena one or more individuals sitting near the user may have bad credit ratings or be untrustworthy, but these individuals are not necessarily associated with the user or known to the user. These individuals could impact an authentication decision regarding the user if information regarding the individuals were used in making the authentication decision, but the information associated with these individuals might have little to do with the user. In that scenario, the size of the sphere can be set so as to exclude many of the individuals surrounding the user.

The sphere can also grow or diminish in size as conditions change. For example, when the user is near the user's spouse and is traveling a typical route to work, the sphere can decrease in size since enough information for a high level of authentication is provided for the user. As another example, when the user is alone and is driving in a part of a city not usually traveled by the user, the sphere can increase in size so as to gather more information from the environment in an attempt to provide a higher level of authentication for the user.

The size of the user's sphere can also be affected by spheres of other individuals that are in close proximity to the user. For example, when the user is surrounded by individuals known to the user who have low levels of authentication or are known to be untrustworthy, the size of the user's sphere can be decreased, as described above.

The level of authentication can also be used to determine what additional information may be needed from the user to authenticate the user. For example if the level of authentication is such that the user cannot be authenticated for a particular activity based on the context, the user may need to provide additional information, for example a user ID and password or a biometric parameter such as a finger print or a voice print before the user can be authenticated.

The level of authentication can represent a level of confidence that the user can be accurately identified and trusted. In one implementation, the level of authentication can comprise a score that represents a level of trust. For example, the score can be a percentage. When the percentage is greater than a certain predetermined threshold, the user can be authenticated. In an example implementation, the predetermined threshold can be 90 percent, although other percentages can be used.

In addition, the level of authentication and the user's context can also determine a level of authorization for the user. The level of authorization can determine a level of access for the user at the electronic computing device. Based on the level of authorization, the user can be authorized to perform a requested action or the request to perform the action can be denied. For example, if the user is in an unwholesome environment and is with untrustworthy individuals, a financial institution may not permit the user to conduct any financial transactions. In this example, the level of authorization for the user can fall to zero.

In determining the level of authorization, a distinction can be made between a confidence in correctly identifying the user (is it me) and a rating of the user (an extent to which the user is honest, responsible and has a good financial history). For example, the rating of the user can be based on such things as a FICO score, which can indicate a level of the user's credit risk. The rating can be used in a calculation of the level of authorization.

One or more detectors, including Internet of Things (IOT) devices can be used to help determine attributes that can determine the user's level of authentication. Examples can include a smartphone that is carried by the user, biometric sensors such as heart rate sensors, body heat sensors and speech sensors, IOT devices in the user's vehicle or home and other detectors. For example, the smartphone can include a global positioning system (GPS) that can identify a geolocation of the smartphone.

Information regarding individuals near or close to the user can be obtained from smartphones of the individuals, from social media networks and from other online sources. For example, if one of the individuals is the user's spouse, the financial institution may have information regarding the spouse's smartphone and can determine the spouse's geolocation from the spouse's smartphone. In situations, where the individuals near or close to the user may be unknown to the financial institution, information regarding the individuals may be determined from text or email messages sent by the user and monitored by the financial institution. When names of the individuals near or close to the user are known, information regarding the individuals may be determined from social media sites or other sources.

The user can elect and authorize what can be used for authentication. Items that can be elected and authorized to use can include biometric devices that can be worn or carried by the user and data from these biometric devices, permission from the user to obtain information regarding individuals that may be near the user, permission from the user to use geolocation information regarding the user, permission from the user to track habits of the user, for example to keep track of a user's route to work and other items.

In some cases, information can be received about the user even when the user did not authorize that information to be used. For example, information can be received about the user from a social media site or geolocation information can be received for the user from a smartphone of another individual near the user. In these cases, the systems and method can implement a form of a gate, in which when information is received about the user and the user did not provide permission for this information, the received information can be deleted or identified in such a way that it will not be used.

The systems and methods disclosed herein are directed to a computer technology that can improve an authentication and authorization of a user at a server computer. The systems and methods can provide a dynamic method of authentication and authorization, such that the user can be authenticated without needing to enter a user ID and password, in which the user can remain authenticated as the user changes a geolocation and current activity and in which the authentication and authorization can be changed or terminated automatically when a determination is made that the user is in an insecure environment. The systems and methods can improve an efficiency of computer systems because a formal login procedure involving a user ID and a password does not need to be implemented each time the user desires to access the computer systems. In addition, security of the computer systems can be improved because current activities of the user can be monitored and a determination can be made as to whether the user is in a secure environment.

Figure 1:
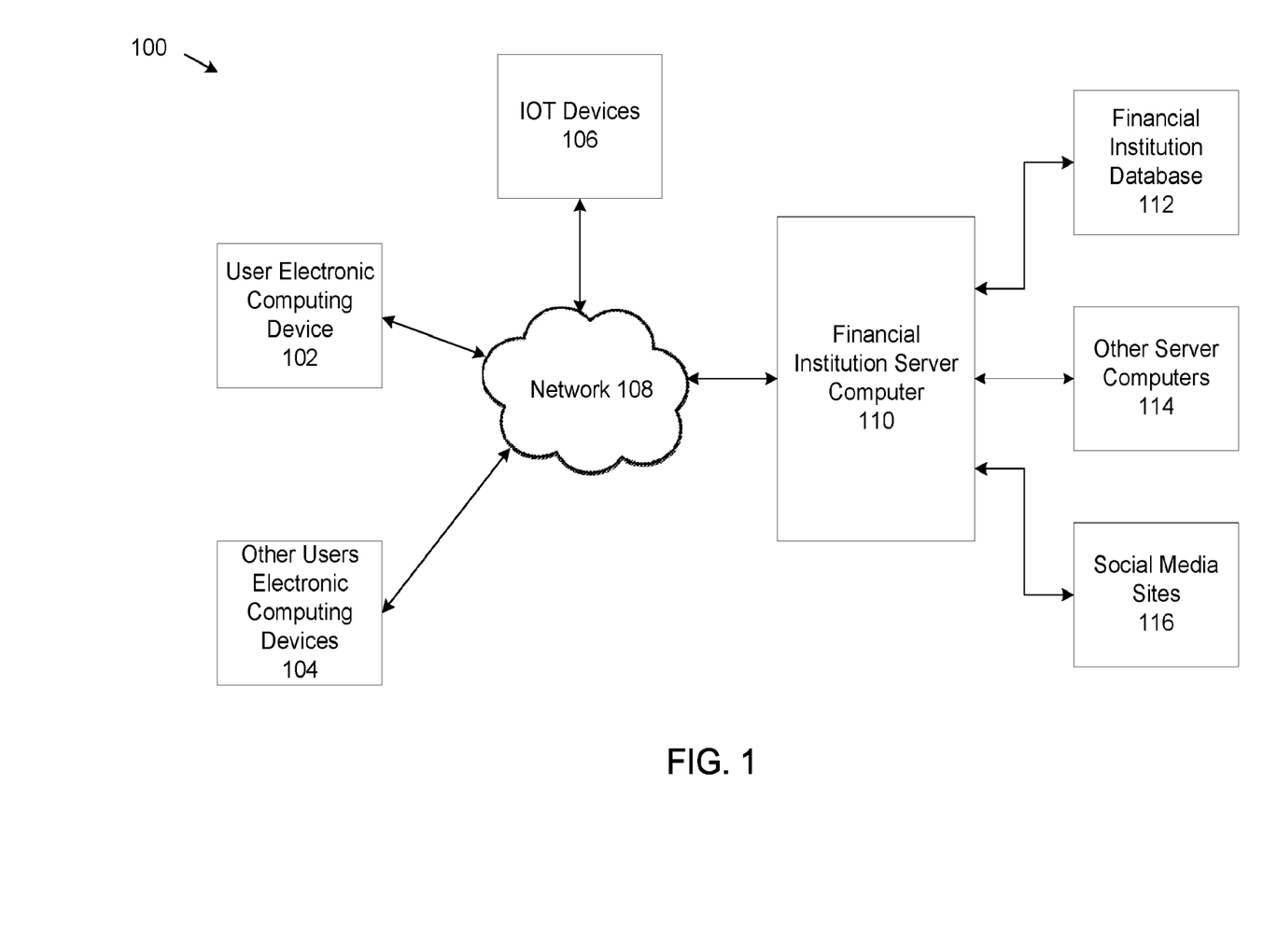
FIG. 1 shows an example system that can support a zone of authentication to provide a defined level of authentication.

FIG. 1 shows an example system 100 that can support a sphere of authentication to provide a defined level of authentication. System 100 includes a user electronic computing device 102, other users electronic computing devices 104, IOT devices 106, a network 108, a financial institution server computer 110, a financial institution database 112, other server computers 114 and social media sites 116. More, fewer or different components are possible.

The example user electronic computing device 102 is a mobile electronic computing device such as a smartphone. The user electronic computing device 102 includes GPS software that permits a server computer, such as financial institution server computer 110, to identify a geolocation of user electronic computing device 102. The user electronic computing device 102 also includes a financial software application that permits a user of user electronic computing device 102 to access and conduct transactions on financial institution server computer 110.

The example other users electronic computing devices 104 are mobile electronic computing devices, such as smartphones, of other users that are at a geolocation close to user electronic computing device 102. For example, the other users can be family members, friends or acquaintances of the user of user electronic computing device 102. Other users electronic computing devices 104 also typically each include GPS software. Identification of the users of other users electronic computing devices 104, can help financial institution server computer 110 make a better assessment as to whether to authenticate the user at financial institution server computer 110.

The example IOT devices 106 are internet of things devices that can provide data to financial institution server computer 110. The data can help financial institution server computer 110 make an assessment as to whether to authenticate the user at financial institution server computer 110. Example IOT device 106 can include biometric sensors such as heart rate sensors, body heat sensors and speech sensors and IOT devices in the user's vehicle or home. For example, a speech sensor may help financial institution server computer 110 identify the user by obtaining a voice print of the user's speech. As another example, IOT devices in the user's vehicle may provide an indication to financial institution server computer 110 that the user is in the vehicle and whether the vehicle is in motion or not.

The example network 108 is a computer network such as the Internet. The user of user electronic computing device 102 can access financial institution server computer 110 across network 108. In addition, IOT devices 106 can provide data to financial institution server computer 110 via network 108.

The example financial institution server computer 110 is a server computer of a financial institution such as a bank. The user can have one or more financial accounts at financial institution server computer 110. Financial institution server computer 110 can include software that can determine a level of authentication for the user and that can build a sphere of authentication around the user. The software can access data from user electronic computing device 102, other users electronic computing devices 104, IOT devices 106, financial institution database 112, other server computers 114, social media sites 116 and other sources to calculate the level of authentication, to calculate a level of authorization and to create the sphere of authentication. In addition, as discussed earlier herein, the level of authentication, level of authorization and sphere of authentication can change dynamically based on an evaluation of the data received at financial institution server computer 110.

The example financial institution database 112 is an electronic database that is associated with financial institution server computer 110 and accessible from financial institution server computer 110. Financial institution database 112 can store financial account records and a personal profile of the user.

The example other server computers 114 are server computers of business and governmental organizations that can provide data regarding the user and that are accessible from financial institution server computer 110. Some examples of other server computers 114 can be server computers of credit score companies such as Experian, Equifax and TransUnion, from which a credit score of the user can be obtained and server computers of government organizations from which data regarding individuals at other users electronic computing devices 104 can be obtained. For example, the server computers of government organizations can provide details regarding any criminal records, pending lawsuits, and other data regarding the individuals.

The example social media sites 116 are web sites of social media organizations such as Facebook and others from which information can be obtained regarding individuals at other users electronic computing devices 104. For example, if an identity of one or more of the individuals is known and information one or more of the social media sites 116 may be able to provide information regarding the individuals. The information can be used to determine a level of trustworthiness for the individuals who may be in close contact with the user. The level of trustworthiness can influence the level of authorization calculated for the individual. For example, when the user attempts to initiate a financial transaction from user electronic computing device 102 and a determination is made that the user is in close contact with one or more individuals who are considered to be untrustworthy, financial institution server computer 110 may lower the user's level of authorization such that the financial institution may prevent the use from completing the financial transaction.

Figure 2:
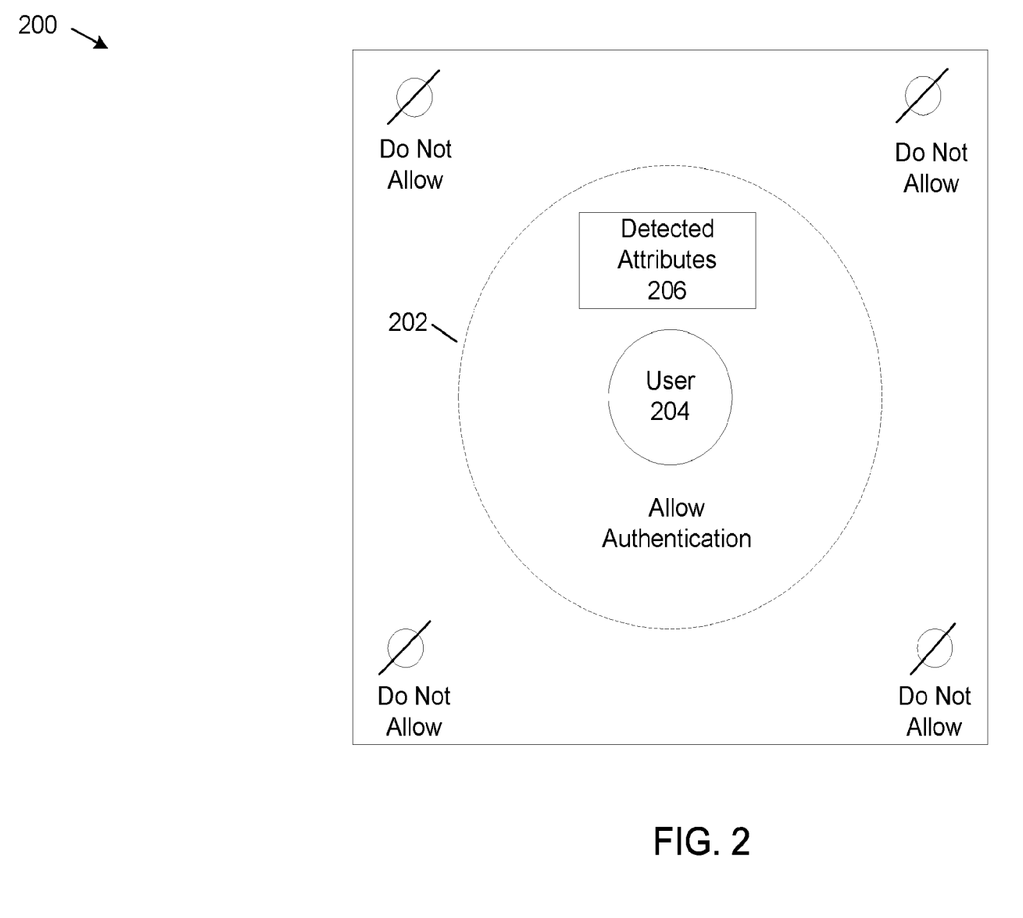
FIG. 2 shows an example user environment that can support a zone of authentication.

FIG. 2 shows an example user environment 200 that includes an example sphere of authentication 202. In the example shown in FIG. 2, the user environment is drawn in the shape of a square. Within the sphere of authentication 202 a level of authentication is high enough that the user is allowed to be authenticated at financial institution server computer 110. Outside the sphere of authentication 202, the level of authentication is low enough so that the user is not allowed to be authenticated at financial institution server computer 110.

The sphere of authentication includes a user 204 and detected attributes 206. The user 204 is a customer of the financial institution and has one or more accounts at the financial institution. The detected attributes 206 are attributes of the user and user environment 200 that can be obtained from one or more of user electronic computing device 102, other users electronic computing devices 104, IOT devices 106, financial institution server computer 110, financial institution database 112, other server computers 114 and social media sites 116. Example of detected attributes 206 can include a geolocation of the user and of individuals at other users electronic computing devices 104, biometric parameters of the user, data regarding the user's vehicle, information regarding the user's financial status and profile information regarding individuals at other users electronic computing devices 104.

As discussed earlier herein, the sphere of authentication 202 can increase or decrease in size as the detected attributes 206 change. For example, when a determination is made that the user is in a vehicle with his spouse or in alone in a vehicle on a route the user normally takes to work, the level of authentication may be high enough to authenticate the user and the sphere of authentication can be of a size corresponding to authentication. However, when the user is in a new geographical area or is in the company of untrustworthy individuals or is driving alone in a route unknown to financial institution server computer 110 or is in another new environment or situation, the user's level of authentication may be lowered so that the user may not be authenticated. In this case the sphere of authentication 202 can shrink to a size corresponding to non-authentication.

Figure 3:
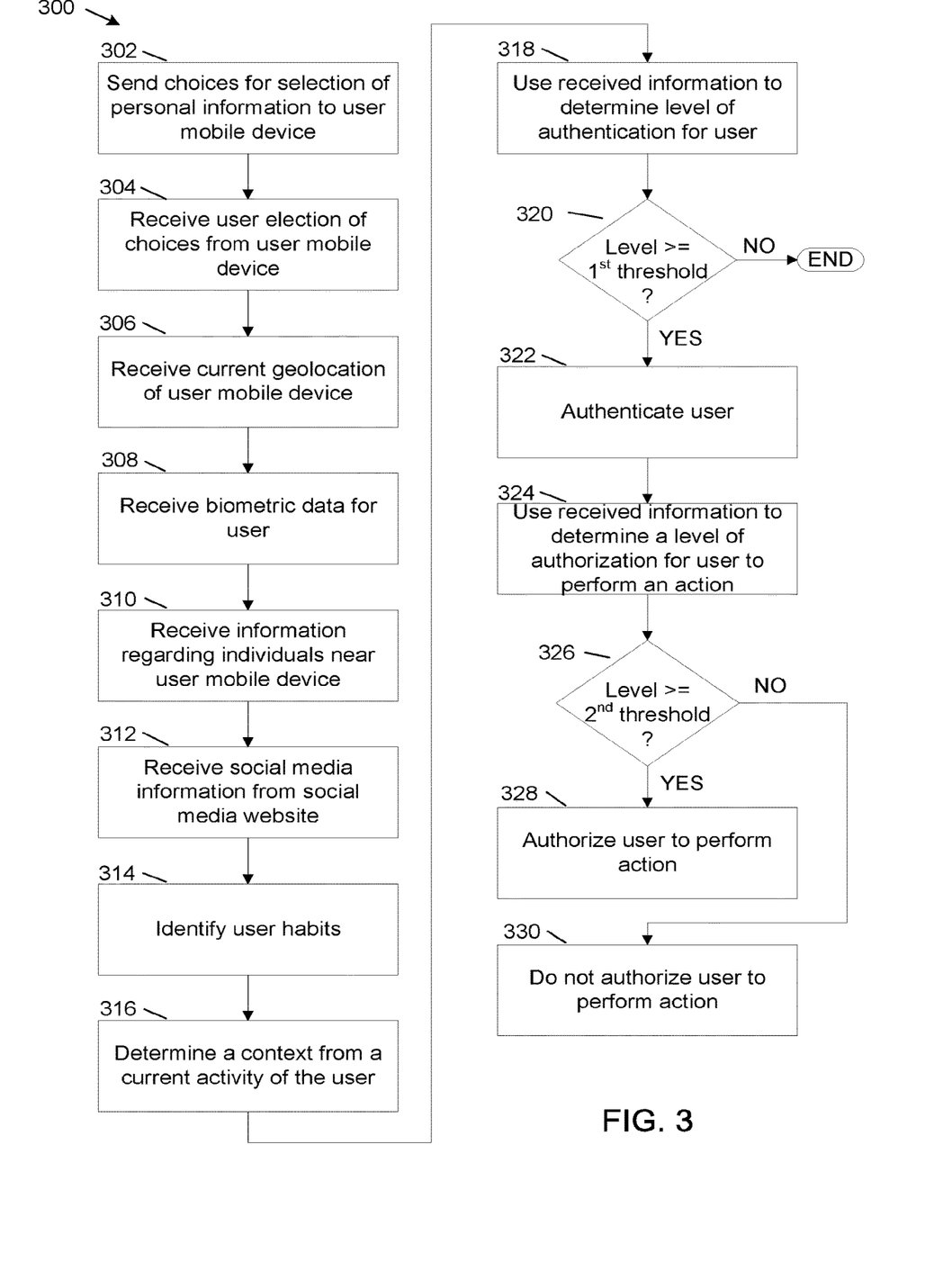
FIG. 3 shows a method implemented on the financial institution server computer of FIG. 1 for dynamically authenticating a user.

FIG. 3 shows a flowchart of an example method 300 for dynamically authenticating a user at a mobile electronic device. For method 300, the electronic computing device is a server computer, for example financial institution server computer 110 and the mobile electronic device is a smartphone.

At operation 302, financial institution server computer 110 sends choices for preference selections of personal information that can be used for dynamically authenticating a user to the user mobile device. The choices can be whether to use such items as GPS information, biometric information, information from IOT devices, information from social media sites, personal profile and financial information, information regarding past and current transactions at the financial institution and other items.

At operation 304, financial institution server computer 110 receives one or more election of choices from the user's smartphone. The elections comprise an opt-in by the user for financial institution server computer 110 to use the elected choices when calculating levels of authentication and authorization for the user at financial institution server computer 110.

At operation 306, financial institution server computer 110 receives a current geolocation of the user's mobile device. The geolocation is obtained from GPS software on the user's smartphone.

At operation 308, financial institution server computer 110 receives biometric data from the user. The biometric data can comprise on or more of user heart rate, blood pressure, temperature, a voice print of the user's speech, a finger print of the user, a facial scan, a retinal scan, the user's speed of movement and other biometric data. The user can opt-in for one of more of these types of biometric data at operation 302. The biometric data can be obtained from specific biometric sensors attached to the user's body, from IOT devices and from one or more software applications on the user's smartphone.

At operation 310, financial institution server computer 110 receives information regarding individuals near the user's smartphone. The information can be obtained from smartphones or other devices of the individuals. For example, when one of the individuals is the user's spouse or other family member or a friend having a financial account at the financial institution, the financial institution may have permission to obtain GPS information from the individual's smartphone. For scenarios where individuals near the user's smartphone may be unknown to the financial institution, information regarding the individuals may be obtained from social media or other sources.

At operation 312, financial institution server computer 110 receives social media information from one or more social media websites. The information may be about the user, for example interests of the user, future purchases of the user, opinions of the user, etc. The information may also be of individuals who are known to the user, such as friends or acquaintances. Financial institution server computer 110 may be able to determine from the social media information for the individuals whether one or more of the individuals may be someone who is untrustworthy or who may be a security risk. When a determination is made that an individual who is untrustworthy or a security risk is in close contact with the user, financial institution server computer 110 can lower the level of authentication and the level of authorization for the user. For example, when the user is physically near an individual who is determined to be untrustworthy or a security risk, the level of authorization may be adjusted such that the user may not be able to conduct a financial transaction in the presence of the individual or the user may be limited in an amount of money the user may be able to transfer at the financial institution.

At operation 314, financial institution server computer 110 identifies habits of the user from information received at financial institution server computer 110. For example, financial institution server computer 110 can determine that the user drives to work using the same route and at the same time each day. As another example, the financial institution server computer 110 can determine that the user likes to frequent a Starbucks coffee shop at the same location most mornings.

At operation 316, a context is determined from a current activity of the user. For example, the user can be determined to be at a shopping mall. A determination can also be made that the user's heart rate is high and that the user has an interest in purchasing a high priced item at a store in the mall. An example context can be that the user is interested in purchasing the item but that is anxious about purchasing the item. As another example, the user can be determined to be at the home of a certain individual. A determination can also be made that this individual is deemed to be untrustworthy or a security risk. In addition, a determination can be made that the user is attempting to conduct a financial transaction on the user's smartphone from the individual's home. An example context can be that the user is attempting to initiate a transfer of funds at the financial institution from the home of an individual who is deemed to be untrustworthy or a security risk.

At operation 318, the information obtained at financial institution server computer 110 and the user context determined at operation 316 are used to determine a level of authentication for the user. The level of authentication can be a number, for example a percentage, which can indicate a level of comfort that the individual can be accurately identified. For example, if the user is determined to be in a familiar location, such as at home or in the user's vehicle on the way to work, the level of authentication can be higher than if the user is at an unfamiliar location, for example in an area of a city that financial institution server computer 110 does not have a record of the user being in previously.

At operation 320, a determination is made as to whether the level of authentication for the user is greater that a predetermined threshold. The predetermined threshold can be a number, for example a percentage, which can be a minimum number to permit authentication for the user at financial institution server computer 110. An example percentage to permit authentication can be 85%, although other percentages can be used.

At operation 320, when a determination is made that the level of authentication is less than the predetermined percentage, authentication is denied for the user at financial institution server computer 110. At operation 320, when a determination is made that the level of authentication is greater than or equal to the predetermined percentage, at operation 322, the user is authenticated at financial institution server computer 110.

At operation 324, information received at financial institution server computer 110 and the user context determined at operation 316 are used to determine a level of authorization for the user to perform an action at financial institution server computer 110. Whereas, the level of authentication can permit authentication based upon an identity of the user, the level of authorization can determine an extent to which the user can conduct transactions or access data at financial institution server computer 110. The level of authorization can be a number, for example a percentage. The number can change significantly based on the context of the current activity of the user and based on the individuals with whom the user may be near. In some situations, when the user is associating with people who are known to be untrustworthy or a security risk, the level of authorization can be zero or even a negative number.

At operation 326, a determination is made as to whether the level of authorization is greater than a predetermined threshold of authorization. In some implementations, there can be a plurality of predetermined thresholds of authorization corresponding to different types of transactions. For example, one predetermined threshold of authorization can be used to permit accessing a financial account balance. A higher predetermined level of authorization can be used to permit a transfer of funds up to a certain dollar amount. A still higher predetermined level of authorization can be used to permit a transfer of funds of a high dollar amount.

At operation 326, when the level of authorization is greater than or equal to the predetermined threshold of authorization, at operation 328 the user is authorized to perform the action. For example, the user can be authorized to perform a specific operation or a specific level of operations at financial institution server computer 110. At operation 326, when the level of authorization is less than the predetermined threshold of authorization, the user is not authorized to perform the action at financial institution server computer 110.

Figure 4:
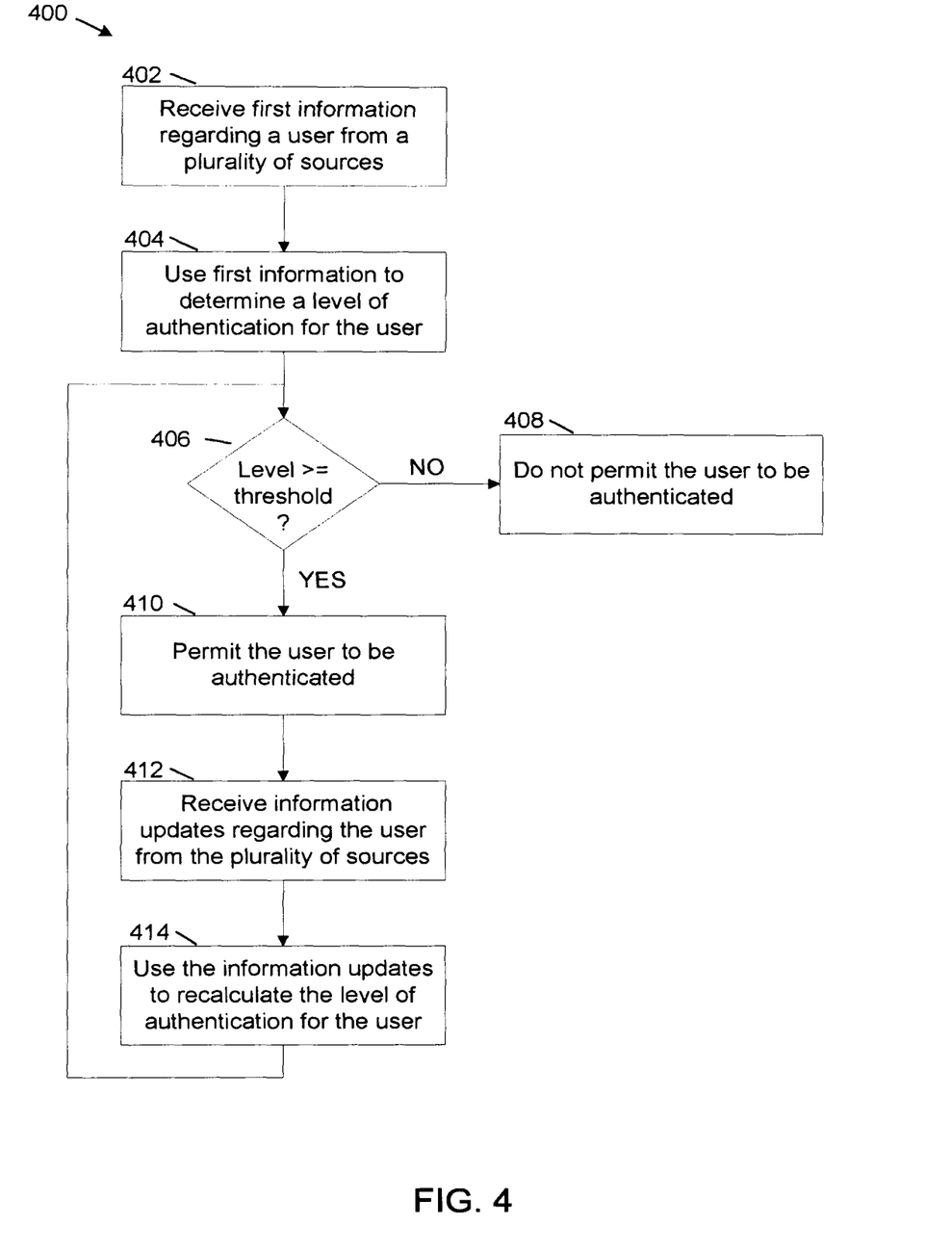
FIG. 4 shows a method implemented on the financial institution server computer of FIG. 1 for dynamically determining a level of authentication for the user.

FIG. 4 shows a flowchart of an example method 400 for dynamically determining a level of authentication for a user. The dynamic determination of the level of authentication for the user can be viewed figuratively via a sphere of authentication for the user. As discussed earlier herein, the sphere of authentication can increase or decrease in size as information regarding a context of a user activity changes or as other information regarding the individual changes. Operations similar to that in method 400 can also be used for dynamically determining a level of authorization for the user.

At operation 402, first information regarding the user is received at a server computer, for example at financial institution server computer 110. The first information can comprise such items as a geolocation of the user, biometric data regarding the user, a financial health status of the user, habits of the user, a current activity of the user and a context of the current activity. Some of the first information can be received from the user's smartphone or from one of more biometric sensors or IOT devices. Other information can be received from other server computers and social media websites. Still other information, such as habits of the user and a context for the current activity can be determined at financial institution server computer 110.

At operation 404, the first information is used to determine a level of authentication for the user, as discussed earlier herein.

At operation 406, a determination is made as to whether the level of authentication is greater than or equal to a predetermined threshold for authentication. At operation 406, when the determination is made that the level of authentication is greater than or equal to the predetermined level of authentication, at operation 410, the user is permitted to be authenticated at financial institution server computer 110.

Once authenticated, at operation 412, updated information is received regarding the user from the plurality of sources. The updated information can comprise any changes to the user's environment, such as changes in the user's geolocation, changes in a current activity of the user and changes in other individuals with which the user may be associating.

At operation 414, the updated information is used to recalculate the level of authentication for the user. For example, if the user was previously at home and now the user is at a geolocation that can be considered less secure or the user is now in the presence of other individuals that are known to be untrustworthy or a security risk, the user's level of authentication can be lowered to correspond to a current environment of the user.

Control then returns to operation 406 where a determination is made as to whether the new level of authentication for the user is still greater than or equal to the predetermined threshold of authentication. When the level of authentication is still greater than the predetermined level of authentication, at operation 410, the user is still permitted to be authenticated. However, when the determination is made that the level of authentication is less than the predetermined level of authentication, at operation 408, the user is not permitted to be authenticated.

Figure 5:
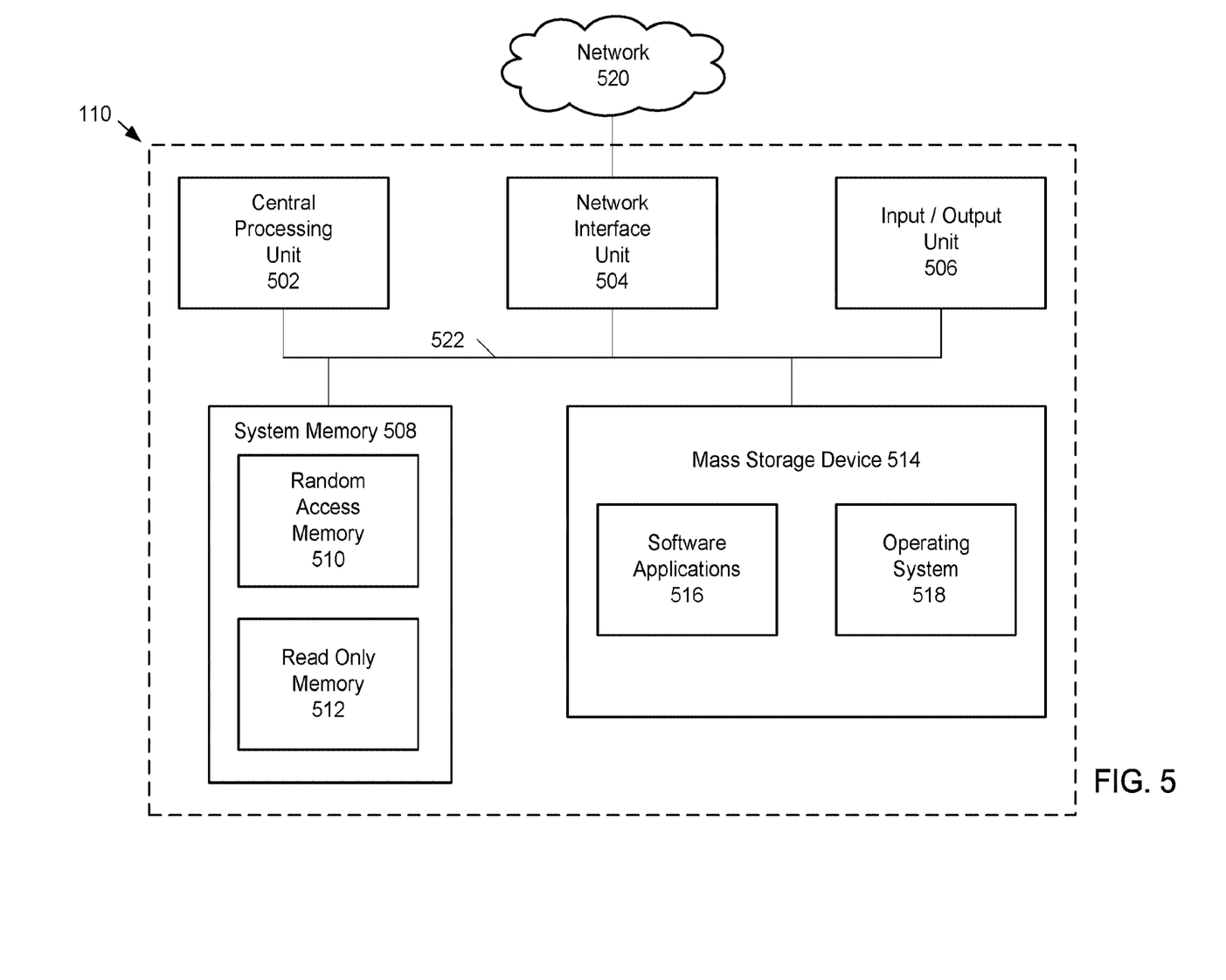
FIG. 5 shows example physical components of the financial institution server computer of FIG. 1.

As illustrated in the example of FIG. 5, financial institution server computer 110 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the financial institution server computer 110, such as during startup, is stored in the ROM 512. The financial institution server computer 110 further includes a mass storage device 514. The mass storage device 514 is able to store software instructions and data. Some or all of the components of the financial institution server computer 110 can also be included in user electronic computing device 102.

The mass storage device 514 is connected to the CPU 502 through a mass storage controller (not shown) connected to the system bus 522. The mass storage device 514 and its associated computer-readable data storage media provide non-volatile, non-transitory storage for the financial institution server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 110.

According to various embodiments of the invention, the financial institution server computer 110 may operate in a networked environment using logical connections to remote network devices through the network 520, such as a wireless network, the Internet, or another type of network. The financial institution server computer 110 may connect to the network 520 through a network interface unit 504 connected to the system bus 522. It should be appreciated that the network interface unit 504 may also be utilized to connect to other types of networks and remote computing systems. The financial institution server computer 110 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the financial institution server computer 110 can store software instructions and data. The software instructions include an operating system 518 suitable for controlling the operation of the financial institution server computer 110. The mass storage device 514 and/or the RAM 510 also store software instructions, that when executed by the CPU 502, cause the financial institution server computer 110 to provide the functionality of the financial institution server computer 110 discussed in this document. For example, the mass storage device 514 and/or the RAM 510 can store software instructions that, when executed by the CPU 502, cause the financial institution server computer 110 to display received data on the display screen of the financial institution server computer 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for authenticating a user at an electronic computing device, the method comprising:
   receiving information from a defined zone of an environment surrounding the user, the information including identities of one or more individuals positioned within the defined zone of the environment, wherein a size of the defined zone is increased or decreased based upon sources of information within the environment;
   calculating a level of authentication for the user at least in part based upon the information from the defined zone of the environment; and
   when the level of authentication meets a threshold, authenticating the user at the electronic computing device.

2. The method of claim 1, further comprising:
   receiving updates to the information;
   recalculating the level of authentication for the user based upon the updates to the information; and
   maintaining the authentication for the user as long as the level of authentication for the user meets the threshold.

3. The method of claim 1, further comprising decreasing the level of authentication for the user when the one or more individuals positioned within the defined zone of the environment are a security risk.

4. The method of claim 1, further comprising receiving from the user one or more elections regarding which aspects of the information can be used by the electronic computing device to calculate the level of authentication.

5. The method of claim 1, wherein the information includes a current context for the user.

6. The method of claim 5, wherein the current context is determined by determining a current activity of the user and determining how the current activity fits into a pattern of behavior for the user.

7. The method of claim 1, wherein the information includes one or more biometric parameters regarding the user.

8. The method of claim 1, wherein the information includes information from one or more social media sites.

9. The method of claim 1, further comprising:
   identifying a first sphere of authentication surrounding the user;
   identifying additional spheres of authentication surrounding the one or more individuals positioned within the defined zone of the environment; and
   determining the level of authentication, in part, based on an effect of the additional spheres of authentication on the first sphere of authentication.

10. The method of claim 1, further comprising modifying the level of authentication for the user as the one or more individuals move into and out of the defined zone of the environment.

11. An electronic computing device comprising:
    a processing unit; and
    system memory, the system memory including instructions which, when executed by the processing unit, cause the electronic computing device to:
       receive information from a defined zone of an environment surrounding the user, the information including identities of one or more individuals positioned within the defined zone of the environment, wherein a size of the defined zone is increased or decreased based upon sources of information within the environment;
       calculate a level of authentication for the user at least in part based upon the information from the defined zone of the environment; and
       when the level of authentication meets a threshold, authenticate the user at the electronic computing device.

12. The electronic computing device of claim 11, wherein the system memory encodes further instructions which, when executed by the processing unit, cause the electronic computing device to:
    receive updates to the information;
    recalculate the level of authentication for the user based upon the updates to the information; and
    maintain the authentication for the user as long as the level of authentication for the user meets the threshold.

13. The electronic computing device of claim 11, wherein the system memory encodes further instructions which, when executed by the processing unit, cause the electronic computing device to decrease the level of authentication for the user when the one or more individuals positioned within the defined zone of the environment are a security risk.

14. The electronic computing device of claim 11, wherein the system memory encodes further instructions which, when executed by the processing unit, cause the electronic computing device to receive from the user one or more elections regarding which aspects of the information can be used by the electronic computing device to calculate the level of authentication.

15. The electronic computing device of claim 11, wherein the information includes a current context for the user.

16. The electronic computing device of claim 15, wherein the current context is determined by determining a current activity of the user and determining how the current activity fits into a pattern of behavior for the user.

17. The electronic computing device of claim 11, wherein the information includes one or more biometric parameters regarding the user.

18. The electronic computing device of claim 11, wherein the information includes information from one or more social media sites.

19. The electronic computing device of claim 11, wherein the system memory encodes further instructions which, when executed by the processing unit, cause the electronic computing device to:
- identify a first sphere of authentication surrounding the user;
- identify additional spheres of authentication surrounding the one or more individuals positioned within the defined zone of the environment; and
- determine the level of authentication, in part, based on an effect of the additional spheres of authentication on the first sphere of authentication.

20. The electronic computing device of claim 11, wherein the system memory encodes further instructions which, when executed by the processing unit, cause the electronic computing device to modify the level of authentication for the user as the one or more individuals move into and out of the defined zone of the environment.

* * * * *